United States Patent Office 2,963,509
Patented Dec. 6, 1960

2,963,509

PROCESS FOR OXIDATION OF MONO-ALKYL BENZENE

Robert S. Barker, Port Washington, and Alfred Saffer, Bayside, N.Y., assignors to Mid-Century Corporation, Chicago, Ill., a corporation of Delaware No Drawing. Filed Mar. 10, 1958, Ser. No. 720,068

6 Claims. (Cl. 260—524)

This invention relates to a process for the catalytic oxidation or organic compounds. More particularly it pertains to the oxidation of mono-alkylbenzenes to produce benzoic acid using molecular oxygen as the oxidizing means and especially to a liquid phase oxidation process catalyzed by the conjoint presence of bromine and a heavy metal oxidation catalyst.

Many processes have been developed for the catalytic oxidation of alkyl substituted aromatic hydrocarbons for the production of polybasic aromatic acids. Relatively little attention has been paid during this development to methods for the preparation of benzoic acid which has heretofore had limited industrial utility. Recently, however, processes having significant commercial value have been developed which employ benzoic acid as a raw material. Among these can be mentioned the conversion of benzoic acid in the form of its alkali metal salts to polycarboxylic acids such as terephthalic acid and isophthalic acid and the oxidative decarboxylation of benzoic acid in the presence of oxygen and water to phenol. With the development of such processes has come a need for a source of relatively cheap and pure benzoic acid.

It has been known for many years that mono-alkylbenzenes can be oxidized by treatment with air in the liquid phase to produce benzoic acid. In United States Patent 2,245,528 to Loder there is described such a process wherein air is bubbled through toluene in the presence of acetic acid, cobalt and manganese acetate as catalyst and methyl-ethyl ketone as an initiator. According to the process therein disclosed, the conversion of toluene to benzoic acid after oxidation for over three hours at elevated temperature is only 47.2 percent, about half of the toluene charged being recovered unchanged. In the oxidation of ethylbenzene and cumene by the process of this patent, conversion and yield to benzoic acid are even lower and considerable amounts of intermediate products of oxidation, for example acetophenone in the oxidation of ethylbenzene, are concomitantly produced. While much research effort has been directed to the development of processes for the preparation of aromatic dicarboxylic acids, little success has been achieved in improving the process for production of benzoic acid disclosed in the above United States patent. Subsequent patents to Henkle, U.S. Patent 2,276,774, and to Hull, U.S. Patent 2,673,217, allegedly improvements in the process disclosed by Loder, further demonstrate the difficulty of obtaining conversions of mono-alkylbenzenes to benzoic acid in excess of about 50 percent.

We have now found that mono-alkylbenzenes can be oxidized in the liquid phase to benzoic acid in high yield and high conversion with increased economy and convenience. It is thus an object of the present invention to provide a method for the conversion of mono-alkylbenzenes to benzoic acid that is capable of providing higher percentage conversions than have heretofore been obtained. Another object is to provide a method for the direct catalytic oxidation in a single step and with improved conversions of mono-alkylbenzenes to benzoic acid. A further object is to provide a cyclic process for the conversion of mono-alkylbenzenes to benzoic acid in benzoic acid solvent whereby a part of the product of reaction is continuously recycled to the oxidation zone to serve as solvent. Still another object is to provide an oxidation process for the conversion of mono-alkylbenzenes to benzoic acid which process permits simple and economic recovery of the reaction product. These and other objects of the present invention will appear hereinafter.

It has been discovered in accordance with the present invention that when a mixture comprising a mono-alkylbenzene and benzoic acid as a solvent and containing a catalyst comprising in conjoint presence bromine and a heavy metal oxidation catalyst is subjected to intimate contact with an oxygen-containing gas, the mono-alkylbenzene is converted in high yields and high conversion to benzoic acid.

In the practice of the invention, the oxidation of mono-alkylbenzenes to benzoic acid may be effected by reacting such compounds with molecular oxygen, for example air, in the conjoint presence of catalytic amounts of a heavy metal oxidation catalyst and of bromine. Metals of the group of heavy metals shown in the "periodic chart of elements" appearing on pages 56 and 57 of the "Handbook of Chemistry," 8th edition, published by Handbook Publishers, Inc., Sandusky, Ohio (1952), have been found desirably applicable to this invention for furnishing the metal portion of the metal-bromine catalyst of the heavy metal group. Those metals having an atomic number not greater than 84 have been found most suitable. Excellent results are obtained by the utilization of a metal having an atomic number 23 to 28 inclusive. Particularly excellent results are obtained with a metal of the group consisting of manganese, cobalt, nickel, chromium, vanadium, molybdenum, tungsten, tin and cerium. It has also been found that the catalytic amount of the metal may be either as a single metal or as a combination of such matters. The metal may be added in elemental, combined or ionic form and the bromine may be added similarly in elemental, combined or ionic form. As a source of ionic bromine, ammonium bromide or other bromine compounds soluble in the reaction medium may be employed. Satisfactory results have been obtained, for example with potassium bromate, tetrabromoethane and benzyl bromide.

The metal may be supplied in the form of metal compounds. For example, the metal manganese may be supplied as the manganese salt of a lower aliphatic carboxylic acid, such as manganese acetate, in the form of an organic complex, of which mention may be made of the acetylacetonate, the 8-hydroxy-quinolinate and the ethylene diamine tetra-acetate, as well as manganese salts such as the borates, halides and nitrates which are also efficacious.

The reaction temperature should be sufficiently high so that the desired oxidation reaction occurs, and yet not so high as to cause undesirable charring or formation of tars. Thus, temperatures in the range of about 120° to about 275° C., desirably 150 to 250° C., and preferably 170 to 225° C. may be employed. The reaction time should be sufficient to obtain a desirable conversion of the substituted aromatic material to the desired aromatic carboxy compound, e.g., in the range of about 0.5 to 25 or more hours, preferably up to about 4 hours.

The oxygen used may be in the form of substantially 100% oxygen gas or in the form of gaseous mixtures containing lower concentrations of oxygen, such as, for example, air. The ratio of total oxygen fed into the reaction mixture relative to the hydrocarbon is in the range of about 2 to 500 moles of oxygen per mole of substituted aromatic material, desirably in the range of 5 to 300, and preferably in the range of 5 to 75.

The process of the present invention should be conducted under essentially liquid phase conditions wherein a liquid phase is maintained in the reaction zone. Thus, the feed is not substantially vaporized. The relation of temperature and pressure should be so regulated as to provide a liquid phase in the reaction zone. Generally, the pressure may be in the range of atmospheric up to about 1500 p.s.i.g. The liquid phase may comprise all or a portion of the organic reactant as well as the benzoic acid reaction medium in which the organic reactant is dissolved.

In the process of the present invention benzoic acid is employed as a solvent medium. The amount of benzoic acid employed is in the range of about 0.1 to 10 parts by weight desirably 0.5 to 4 and preferably 1 to 2.5 parts per part of the mono-alkylbenzene charged.

The use of benzoic acid as a solvent medium in the process of the present invention has certain unique advantages in providing an economical and simplified process for the preparation of benzoic acid. Thus, the solvent medium employed is identical with the product produced in the process and hence complex solvent recovery, solvent purification and solvent recycle schemes usually resorted to in liquid phase oxidation processes employing inert solvent media are rendered unnecessary. The reaction product obtained in accordance with the present invention can be purified by distillation or sublimation of the total oxidation reactor effluent without the need for expensive fractional distillation equipment. The recovered benzoic acid may be employed as solvent in subsequent oxidations, a portion of the benzoic acid product being returned to the reactor and the remainder being separated as product. Where desirable, only a portion of the oxidation effluent need be purified, for example by distillation, the bottoms from such distillation comprising benzoic acid together with metal catalyst being recycled directly to the oxidation reactor. In such case, sufficient bromine in the form of bromide ion will ordinarily be recycled with the heavy metal catalyst to provide an adequate concentration of bromine in the oxidation reactor. Additional heavy metal catalyst and/or bromine compound may be added to the recycled benzoic acid to make up any losses. In a continuous oxidation process wherein a mono-alkylbenzene feedstock is continuously added to an oxidation reactor together with catalytic amounts of bromine and heavy metal oxidation catalyst, the use of benzoic acid as a reaction solvent permits the continuous removal of benzoic acid product at a rate substantially equal to its rate of formation in the reactor without the need for addition of further quantities of solvent to the reactor.

The catalyst illustratively may be manganese bromide and it may be added as such or by means of materials which provide a catalytic amount of manganese and of bromine in the reaction system. Manganese may be added in the form of the metal oxide or acetate or analogous carboxylate salts including manganese benzoate or as a manganese halide. The bromine may, as above indicated be added in the form of elemental bromine as ammonium bromide or other bromine compounds soluble or partially soluble in the reaction system, for example potassium bromate. If desired, the bromine may be in the form of a soluble organic bromide such as tetrabromoethane, benzyl bromide and the like. The amount of the catalyst calculated as manganese bromide may be in the range of about 0.1 to 10% by weight or more of the aromatic reactant charged, desirably 0.3 to 2 and preferably 0.5 to 1.7%. Mixtures of materials may be used and the proportions of manganese and bromine may be varied from the stoichiometric proportions encountered in manganese bromide ($MnBr_2$), for example in the range of about 1 to 10 atoms of manganese per atom of bromine to about 1 to 10 atoms or bromine per atom of manganese. Moreover the manganese may, as above indicated, be utilized in the form of an organic complex such as the acetylacetonate, the 8-hydroxy-quinolinate and the ethylene di-amine tetra-acetate of manganese.

In order to facilitate a clear understanding of the invention, the following preferred specific embodiments are described in detail.

*Example 1*

In a tubular reactor fitted with a stirrer and heating means and provided with a water cooled condenser, gas inlet means and valved gas outlet for adjusting the exit flow of gas were charged 150 g. benzoic acid, 0.23 g. cobalt acetate and 0.42 g. manganese acetate (as the tetrahydrates). To this was added a solution of .64 g. of tetrabromoethane in 75 g. of toluene, and the mixture heated to 190–200° C. Air at a rate of 5 to 6 standard liters/minute was passed through the mixture while maintaining a reactor pressure of about 385 p.s.i.g. At the end of 27 minutes, analysis of the vent gases indicated no further oxygen absorption. The reactor contents were cooled and analyzed. A yield of 95.7 g. or 96 mole percent of benzoic acid was obtained having a melting point of 122° C. and acid number of 453.

In order to show that bromine is a necessary catalyst component, the above procedure was repeated in the absence of any added bromine-containing compound. At the end of 87 minutes employing an air flow rate of 6.6 liters/minute at 380 p.s.i.g. and 200–205° C. temperature, no oxygen consumption was obtained. A total of 142 g. of the benzoic acid solvent charged was recovered, and 53 g. of toluene. No benzoic acid was formed.

*Example 2*

Following the procedure of Example 1, a mixture of 75 g. ethylbenzene, 150 g. benzoic acid, 0.6 g. of a mixture of cobalt acetate and manganese acetate (as the tetrahydrates) and 0.6 g. of tetrabromoethane was treated with air at a flow rate of 5–6 liters/minute at a temperature of 205–210° C. and a reactor pressure of 380 p.s.i.g. At the end of 63 minutes oxygen uptake was nearly theoretical. An essentially quantitative yield of benzoic acid having a melting point of 118° C. and acid number of 459 was obtained.

*Example 3*

Following the procedure of Example 1, a mixture of 200 parts of toluene, 20 parts of benzoic acid, 1.5 parts of a mixture cobalt acetate and manganese acetate (as the tetrahydrates) and 1.0 part of tetrabromoethane was treated with air at a flow rate of 5.7 liters/minute at a temperature of 200° C. and a reactor pressure of 400 p.s.i.g. At the end of 96 minutes slightly more than theory of oxygen had been consumed. There was obtained 213 g. of benzoic acid of melting point 120° C. and acid number 454.

It will be seen from the preceding examples that the oxidation of mono-alkylbenzenes in benzoic acid solvent in the presence of a catalyst comprising in conjoint presence bromine and a heavy metal oxidation catalyst results in high yields of benzoic acid of extremely high purity. As will be apparent from the examples, a larger amount of benzoic acid solvent results in a more rapid oxidation of the feedstock. While as little as 10% of benzoic acid solvent based on alkylbenzene can be effectively employed, lesser amounts require appreciably longer reaction times to obtain commercially attractive conversions.

The process of the present invention can be conducted on a continuous, intermittent or batch basis. Water may be removed to maintain any desired concentration thereof, for example by distillation, etc.

Desirable or comparable results may be achieved with various modifications of the process described and exemplified above. Because of the rapid rate of reaction, alkylbenzenes such as toluene may be oxidized in benzoic acid in a continuous reactor, the reaction being conducted so as to convert all or a portion of the hydrocarbon feedstock to benzoic acid. In such a continuous process wherein the feedstock is partially, for example, from about 10 to about 40%, converted to benzoic acid, all or a portion of the reactor contents can be continuously or intermittently separated and/or cooled and a portion of the benzoic acid formed removed by filtration. The resulting filtrate comprising a saturated solution of benzoic acid in hydrocarbon feedstock is then recycled to the oxidation reactor, additional oxidizable hydrocarbon being added so as to maintain any desired concentration of benzoic acid. Likewise additional heavy metal catalyst and/or bromine compound may be added to maintain the desired concentrations thereof. In this manner excellent yields of extremely high purity benzoic acid are obtained. Further purification for removal of traces of catalyst components may, if desired, be accomplished by washing the benzoic acid with additional quantities of hydrocarbon feedstock, by crystallization from said hydrocarbon or other solvent, or by distillation of the benzoic acid in known manner.

The reaction pressure may be varied in the range of atmospheric to about 1500 p.s.i.g., the pressure being sufficient to maintain all or a part of the organic reactant in the liquid phase. It will be recognized that time, temperature, catalyst concentration, solvent concentration and the like are interrelated variables and may be varied depending upon the particular feedstock employed. Lower temperatures may, for example be indicated where a more highly concentrated source of molecular oxygen is employed in lieu of air, for example pure oxygen or mixtures of oxygen and inert gas containing 50% or more by volume of molecular oxygen.

The substituted benzene compound treated in accordance with the process of the present invention may be a mono-alkylbenzene in technically pure form, free of contaminants or materials which may interfere with the oxidation reaction. Generally mono-alkylbenzenes having from 1 to 8 carbon atoms in the alkyl group, preferably 1 to 4 carbon atoms are employed. Such substituents include, for example, methyl, ethyl, isopropyl, butyl and the like. Tertiary butyl groups which are attached to the benzene ring at the site of the tertiary carbon atoms, are more difficult to oxidize and may require more elevated temperature and/or higher catalyst concentration to effect conversion to the carboxyl group.

Partial oxidation products of the above mentioned materials may also be treated according to the present invention, e.g. where the alkyl substituent is converted to intermediate oxygenated derivatives such as alcohols, aldehydes, ketones peroxide type compounds and the like, for example compounds such as benzaldehyde, benzyl alcohol, cumene hydroperoxide, and the like.

The benzoic acid produced by the process of the present invention is of high purity and may be used directly without further purification for various synthetic purposes. For example, it may be converted directly to alkali metal salts such as potassium benzoate which can then be subjected to high temperature treatment in accordance with known processes for the preparation of aromatic dicarboxylic acids such as terephthalic acid. Likewise the oxidation product of the present process may be subjected without further purification to oxidative decarboxylation in the presence of copper catalysts for the production of phenol. It will be clear that, for these purposes, the present process employing benzoic acid as a solvent for the oxidation of alkylbenzenes and the like to benzoic acid has the added advantage of not requiring the separation of the benzoic acid product from any added solvent, both product and solvent being identical.

Numerous other advantages of the instant invention will be readily apparent to those skilled in the art and it is to be understood that changes and variations may be made without departing from the spirit and scope of the invention as defined in the appended claims.

This case is a continuation-in-part of application Serial No. 530,401, filed August 24, 1955, and now U.S. Patent No. 2,833,816.

We claim:

1. A process for the preparation of benzoic acid which comprises reacting a mono-alkylbenzene hydrocarbon having from 1 to 8 carbon atoms in the alkyl group in the liquid phase at a temperature between about 120° and about 275° C. and a pressure between atmospheric and 1500 p.s.i.g. with molecular oxygen in a solvent which is essentially benzoic acid and in the conjoint presence of bromine and a heavy metal oxidation catalyst.

2. The process of claim 1 wherein the benzoic acid solvent is present in a ratio of from about 0.1 to about 10 parts by weight per part of monoalkylbenzene.

3. The process of claim 2 wherein the heavy metal oxidation catalyst has an atomic number of 23 to 28 inclusive.

4. The process of claim 2 wherein the heavy metal oxidation catalyst comprises manganese and cobalt.

5. The process of claim 2 wherein the alkylbenzene is toluene.

6. The process of claim 2 wherein the alkylbenzene is ethylbenzene.

References Cited in the file of this patent

UNITED STATES PATENTS

| | | |
|---|---|---|
| 2,245,528 | Loder | June 10, 1941 |
| 2,444,924 | Farkas et al. | July 13, 1948 |
| 2,833,816 | Saffer et al. | May 6, 1958 |